Nov. 7, 1933.　　　　R. B. HURT　　　1,934,125
RANGE
Filed Jan. 20, 1932　　2 Sheets-Sheet 2
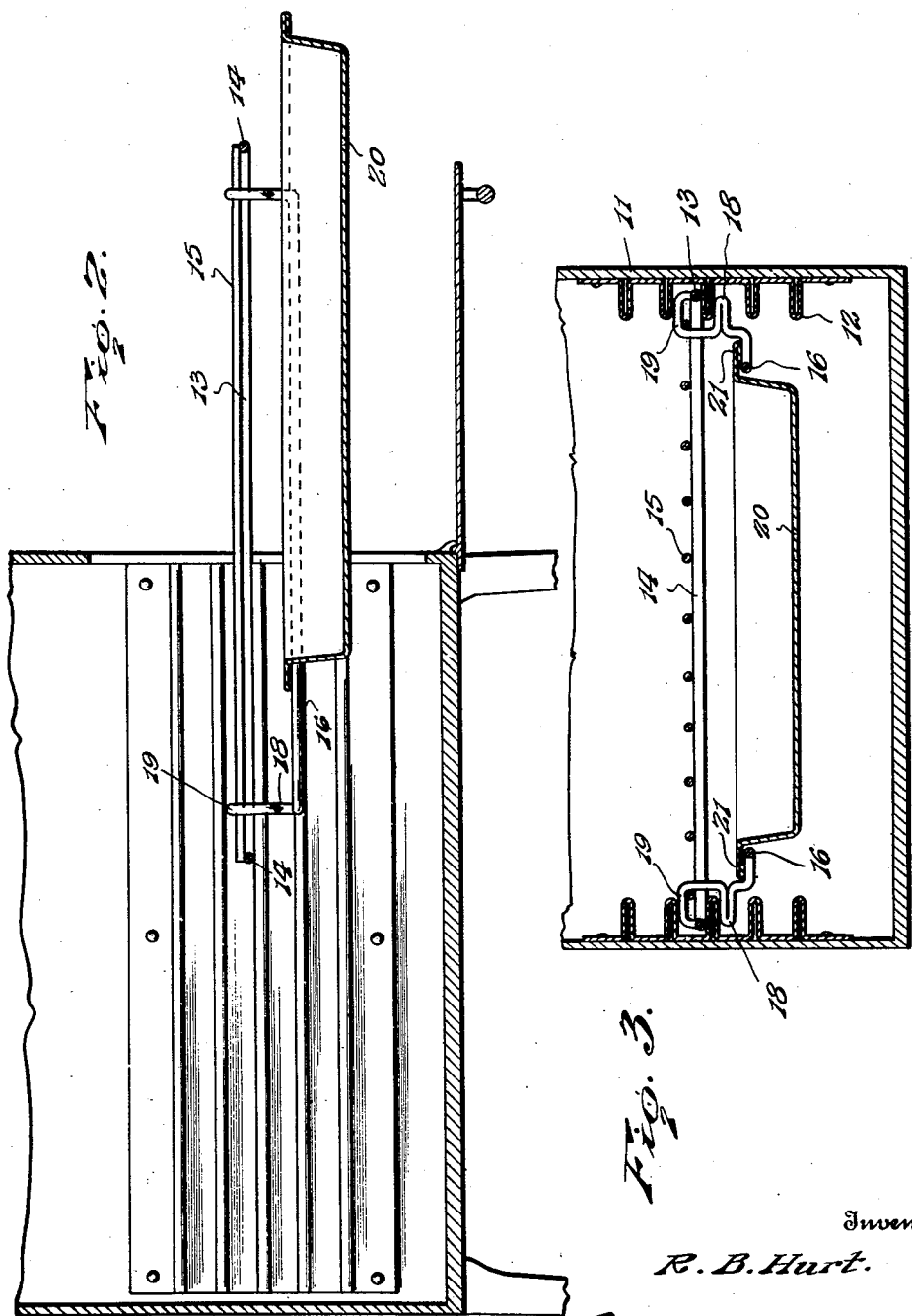

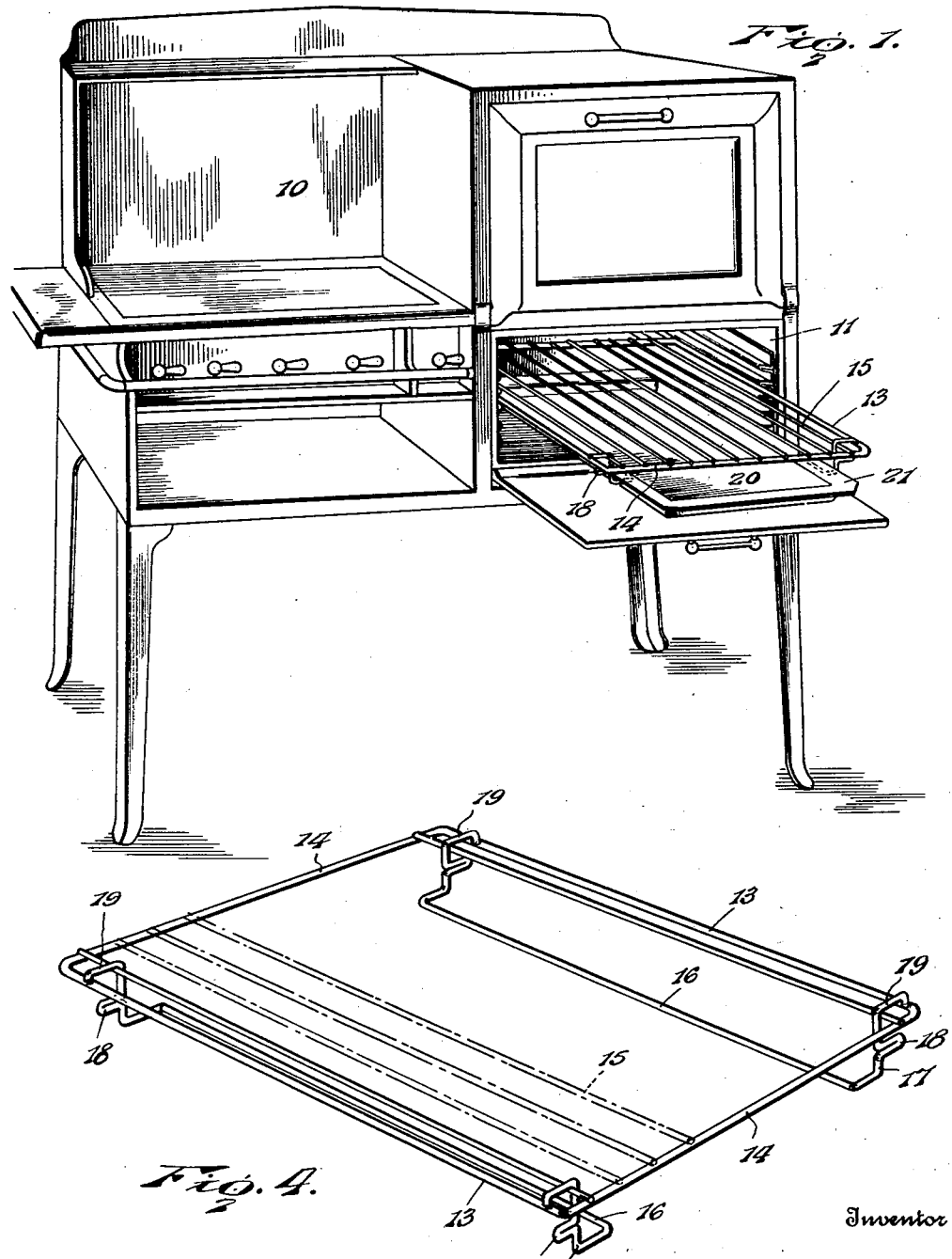

Patented Nov. 7, 1933

1,934,125

UNITED STATES PATENT OFFICE 1,934,125

RANGE

Robert B. Hurt, Cleveland, Tenn., assignor, by mesne assignments, to Hardwick Stove Company, Cleveland, Tenn., a corporation of Delaware Application January 20, 1932. Serial No. 587,795

4 Claims. (Cl. 126—339)

This invention relates to improvements in ranges, particularly to a novel broiling rack and pan, and while being well adapted for general use is nevertheless especially intended to be employed in connection with a range of the character shown in my co-pending application filed December 8th, 1931, Serial No. 579,799.

The invention seeks, among other objects, to provide a rack and pan wherein the rack as well as the pan will be prevented, when partially withdrawn from the range oven, from tilting and spilling the contents of the pan as is ordinarily experienced with conventional pans.

The invention seeks, as a further object to provide an arrangement wherein the pan will be carried by the rack and wherein the pan may be slidably shifted on the rack independently thereof so that after the rack with the pan thereon, has been partially withdrawn from the oven, the pan may be further withdrawn on the rack to permit ready access to the pan as would be convenient when basting.

And the invention seeks, as a still further object to provide a construction wherein the pan may be readily removed from the rack so that the pan may be readily cleaned while also the rack may be used independently of the pan.

Other and incidental objects not specifically mentioned in the foregoing, will be apparent during the course of the following description.

Fig. 1 is a perspective view showing my improved rack and pan in connection with a conventional range, Fig. 2 is a fragmentary vertical sectional view, Fig. 3 is a transverse section, Fig. 4 is a detail perspective view of the rack.

Referring now more particularly to the drawings, I have shown a conventional gas range at 11. This range is provided with the usual oven 11 and secured to the sides of the oven, as particularly seen in Fig. 3, are sheet metal plates providing parallel flanges 12, defining channels therebetween.

In conjunction with the oven I provide an oblong rack including a frame comprising side bars 13, end bars 14 and a plurality of parallel longitudinal bars 15. Extending beneath the side margins of the rack frame in spaced parallel relation thereto is a pair of hangers 16. Each of these hangers is preferably formed from a single length of material offset as indicated at 17 and then bent in closed U-shape to provide a pair of outwardly projecting lower guides 18 whence the end portions of the length of material is bent upwardly and outwardly in inverted U-shape to form a pair of upper guides 19 overhanging the lower guides. As particularly shown in Fig. 4, the guides 19 of the hangers are engaged over and secured to those of the bars 15 next to the side bars 13 of the rack frame while the ends of the hangers are fixed to said side bars. As will be seen, this construction provides unusual rigidity for the hangers and will tend to prevent the hangers from becoming dislodged or swinging apart under a load thereon.

Normally coacting with the rack is an oblong pan 20 of a width to be freely received between the hangers 16 and provided with side and end flanges, the former being indicated at 21. The pan may be of any approved depth and, as shown in Fig. 3, the flanges 21 are disposed to overlie the hangers slidably coacting therewith so that the pan will thus be supported for free sliding movement on the rack.

As will now be seen, the rack is adapted to fit in the oven 11 resting on any selected pair of the flanges 12, the side bars 13 of the rack frame sliding coacting with the pair of flanges selected so that the rack may be readily slid into and out of the oven, while also, as will be understood, the height of the rack may be readily varied. As best brought out in Figs. 2 and 3 of the drawings, the guides 18 quite snugly engage beneath the flanges on which the rack rests while the guides 19 more or less closely confront the pair of flanges 12 next above the former flanges. Accordingly, when the rack is partially withdrawn, with the pan thereon as shown in Fig. 2, the guides at the inner end portion of the rack will coact with such flanges to limit the rack against downward tilting movement. Spilling of the contents of the pan will thus be obviated. After the rack has been partially withdrawn, the pan may then be further withdrawn on the rack, as shown, to permit ready access to the pan and as will be understood, the pan may be entirely removed, if desired, so that the rack may be used alone.

Having thus described the invention, what is claimed is:

1. In a stove, an oven having rack supporting means provided with spaced upper and lower flanges, and a rack slidable upon the lower flanges and provided with guides to engage beneath both the upper and lower flanges for limiting the rack against downward tilting movement when the rack is partially withdrawn from the oven.

2. In a stove, an oven having rack supporting means provided with spaced upper and lower flanges, a rack slidable upon the lower flanges and provided with guides to engage beneath both the upper and lower flanges for limiting the rack against downward tilting movement when the rack is partially withdrawn from the oven, and a pan carried by the rack.

3. In a stove, an oven having rack supporting means provided with spaced upper and lower flanges, a rack slidable on the lower flanges, hangers carried by the rack and formed to provide guides to engage beneath both the upper and lower flanges for limiting the rack against downward tilting movement when the rack is partially withdrawn from the oven, and a pan slidably supported by said hangers.

4. In a stove, an oven having rack supporting means provided with spaced upper and lower flanges, a rack slidable on the lower flanges, and hangers carried by the rack and each formed from a length of material bent to provide a guide projecting beneath one of the lower flanges and a second guide projecting beneath one of the upper flanges close thereto whereby said guides will engage beneath both the upper and lower flanges for limiting the rack against downward tilting movement when the rack is partially withdrawn from the oven.

ROBERT B. HURT. [L. S.]